(12) United States Patent
Inui

(10) Patent No.: US 8,069,458 B2
(45) Date of Patent: Nov. 29, 2011

(54) BROADCAST RECEIVING DEVICE

(75) Inventor: Yasuhiro Inui, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 671 days.

(21) Appl. No.: 11/947,273

(22) Filed: Nov. 29, 2007

(65) Prior Publication Data

US 2008/0134238 A1 Jun. 5, 2008

(30) Foreign Application Priority Data

Dec. 1, 2006 (JP) .................................. 2006-325393

(51) Int. Cl.
*H04N 7/16* (2011.01)
(52) U.S. Cl. .................... 725/25; 27/28; 27/29; 27/30
(58) Field of Classification Search .................. None
See application file for complete search history.

(56) References Cited

U.S. PATENT DOCUMENTS

| | | | | |
|---|---|---|---|---|
| 7,472,424 | B2 * | 12/2008 | Evans et al. ..................... | 726/27 |
| 2005/0060740 | A1 * | 3/2005 | Stecyk ............................. | 725/28 |
| 2005/0097595 | A1 * | 5/2005 | Lipsanen et al. ................ | 725/25 |
| 2005/0283807 | A1 * | 12/2005 | Lee et al. ......................... | 725/62 |
| 2007/0204304 | A1 * | 8/2007 | Kim .................................. | 725/51 |
| 2007/0214472 | A1 * | 9/2007 | Kim et al. ........................ | 725/28 |
| 2008/0046914 | A1 * | 2/2008 | Gummadi ........................ | 725/25 |
| 2008/0216108 | A1 * | 9/2008 | Beaunoir et al. ................ | 725/25 |

FOREIGN PATENT DOCUMENTS

JP 2000-354209 A 12/2000

OTHER PUBLICATIONS

"Program blocking technology requirements for television receivers"; Code of Federal Regulations; 47 CFR Ch. 1; § 15.120; Oct. 2006.

* cited by examiner

*Primary Examiner* — Joseph P Hirl
*Assistant Examiner* — Fred Peng
(74) *Attorney, Agent, or Firm* — Global IP Counselors

(57) ABSTRACT

A broadcast receiving device includes a table storage component, a viewing control acquisition component, a first determination component and a table production component. The viewing control acquisition component acquires program viewing control information including a column number and a row number. The first determination component determines whether or not to satisfy one of a column determination condition that the column number is greater than a first specific number of a first viewing control table and a row determination condition that the row number is greater than a second specific number of the first viewing control table. The table production component produces a second viewing control table having a number of columns corresponding to the column number and a number of rows corresponding to the row number when the first determination component determines that one of the column determination condition and the row determination condition is satisfied.

12 Claims, 7 Drawing Sheets

| RATING CATEGORY TYPE | TV-AA ORDER | TV-BB CATEGORY | TV-CC CATEGORY |
|---|---|---|---|
| LEVEL 1 | X | DD | HKF |
| LEVEL 2 | NC-17 | S | JJ |
| LEVEL 3 | R | RR | PP |
| LEVEL 4 | PG-13 | ... | ... |
| LEVEL 5 | PG | ... | ... |
| LEVEL 6 | G | ... | ... |
| LEVEL 7 | NR | ... | ... |

| RATING CATEGORY TYPE | | | | DIM3 ORDER |
|---|---|---|---|---|
| LEVEL 1 | | | | LEVEL1 |
| LEVEL 2 | | | | LEVEL2 |
| LEVEL 3 | | | | LEVEL3 |
| LEVEL 4 | | | | LEVEL4 |
| LEVEL 5 | | | | LEVEL5 |

BROADCAST RECEIVING DEVICE

CROSS-REFERENCE TO RELATED APPLICATIONS

This application claims priority to Japanese Patent Application No. 2006-325393 filed on Dec. 1, 2006. The entire disclosure of Japanese Patent Application No. 2006-325393 is hereby incorporated herein by reference.

BACKGROUND OF THE INVENTION

1. Field of the Invention

The present invention generally relates to a broadcast receiving device. More specifically, the present invention relates to a broadcast receiving device for receiving television broadcasts.

2. Background Information

Broadcast receiving devices receive television broadcasts and output the television broadcasts to monitors so that the television broadcasts are visible from outside. The number of channels that can be viewed has been increasing with an increase of popularity of digital broadcasts. There are now more programs that include violence, obscenity, and so forth. Therefore, there is a growing need to control the programs that can be viewed by children, so that the children will not be exposed to such programs.

With some conventional television receiver, a user selects in advance a rating level to be subject to viewing control (see Japanese Laid-Open Patent Application 2000-354209, for example). Rating information indicating viewing control conditions is extracted from a television signal. Specifically, the rating information is transmitted with the television signal. Then, a received rating level corresponding to the rating information is identified. If the received rating level is equal to or lower than the selected rating level, then viewing control is executed. In other words, viewing of the television signal is blocked.

Meanwhile, on Mar. 15, 2006, the FCC (Federal Communications Commission) mandated that broadcast receiving devices shall include a function for acquiring an RRT (Rating Region Table) transmitted in a broadcast and updating a viewing control table (hereinafter referred to as a rating table) based on the acquired RRT (see Code of Federal Regulations, Title 47—Telecommunication, Chapter I, §15.120, "Program blocking technology requirements for television receivers"). The rating table is a table that specifies viewing control conditions preset according to positions in a column direction and positions in a row direction.

Also, program viewing control information specifies the viewing control conditions for each program. The program viewing control information is information included in a program information table (event information table; hereafter referred to as "EIT"). The program viewing control information is transmitted as a CAD (Content Advisory Descriptor). The CAD specifies the viewing control conditions as number information indicating a position in a column direction of the rating table and as number information indicating a position in a column direction (see ATSC (Advanced Television Systems Committee) Standard A/65C, for example).

Therefore, the broadcast receiving device can set whether or not the program viewing control specified by the CAD is to be executed by referring to the rating table. However, referring to ATSC Standards A/65C and A/69a, a transmission period of the EIT which includes the CAD is 0.5 second. A transmission period of the RRT is 60 seconds. Thus, the transmission period of the EIT is shorter than the transmission period of the RRT. Therefore, it happens that the CAD indicating the specific location of an updated RRT is received before the updated RRT is received. The user cannot set whether or not to execute the viewing control corresponding to the CAD until the updated RRT is received.

In view of the above, it will be apparent to those skilled in the art from this disclosure that there exists a need for an improved broadcast receiving device. This invention addresses this need in the art as well as other needs, which will become apparent to those skilled in the art from this disclosure.

SUMMARY OF THE INVENTION

The present invention was conceived in light of the above-mentioned problems. One object of the present invention is to provide a broadcast receiving device with which viewing control is set properly.

In accordance with one aspect of the present invention, a broadcast receiving device for receiving a television broadcast includes a table storage component, a viewing control acquisition component, a first determination component and a table production component. The table storage component is configured to store a first viewing control table having a first specific number of columns and a second specific number of rows. The first viewing control table includes viewing control conditions for viewing control. The viewing control acquisition component is configured to acquire program viewing control information including a column number and a row number and specifying the viewing control conditions for a program using the column number and the row number. The first determination component is configured to determine whether or not to satisfy one of a column determination condition that the column number of the program viewing control information is greater than the first specific number of the first viewing control table and a row determination condition that the row number of the program viewing control information is greater than the second specific number of the first viewing control table. The table production component is configured to produce a second viewing control table having a number of columns corresponding to the column number of the program viewing control information and a number of rows corresponding to the row number of the program viewing control information when the first determination component determines that one of the column determination condition and the row determination condition is satisfied.

With the broad cast receiving device of the present invention, it is possible to provide a broadcast receiving device with which viewing control is set properly.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure:

FIG. 4A is a diagram illustrating an example of a stored viewing control table;

FIG. 4B is a diagram illustrating an example of a tentative viewing control table;

DETAILED DESCRIPTION OF THE PREFERRED EMBODIMENTS

A preferred embodiment of the present invention will now be explained with reference to the drawings. It will be apparent to those skilled in the art from this disclosure that the following description of the preferred embodiment of the present invention is provided for illustration only and not for the purpose of limiting the invention as defined by the appended claims and their equivalents.

Figure 1:
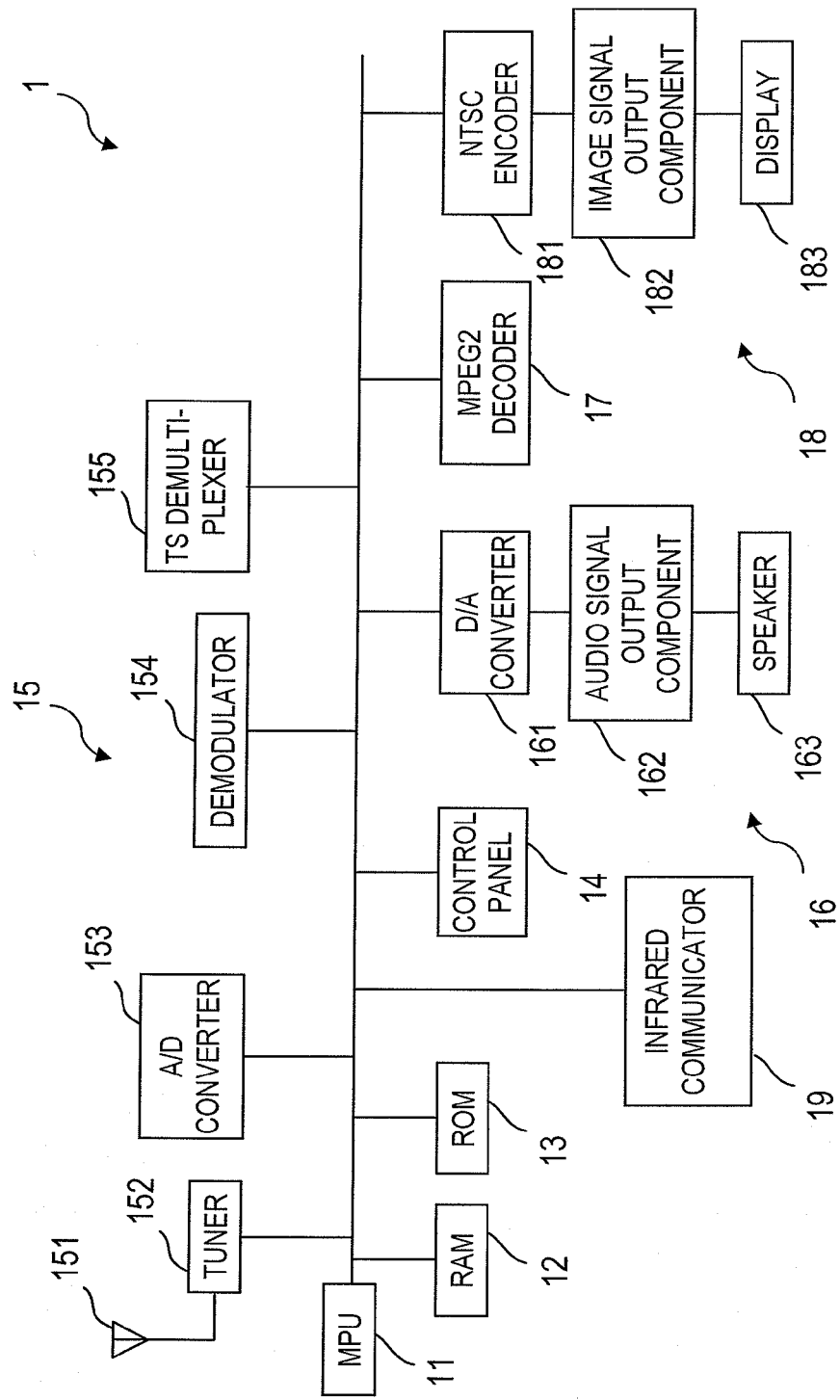
FIG. 1 is a block diagram illustrating a broadcast receiver in accordance with one embodiment of the present invention.
Figure 2:
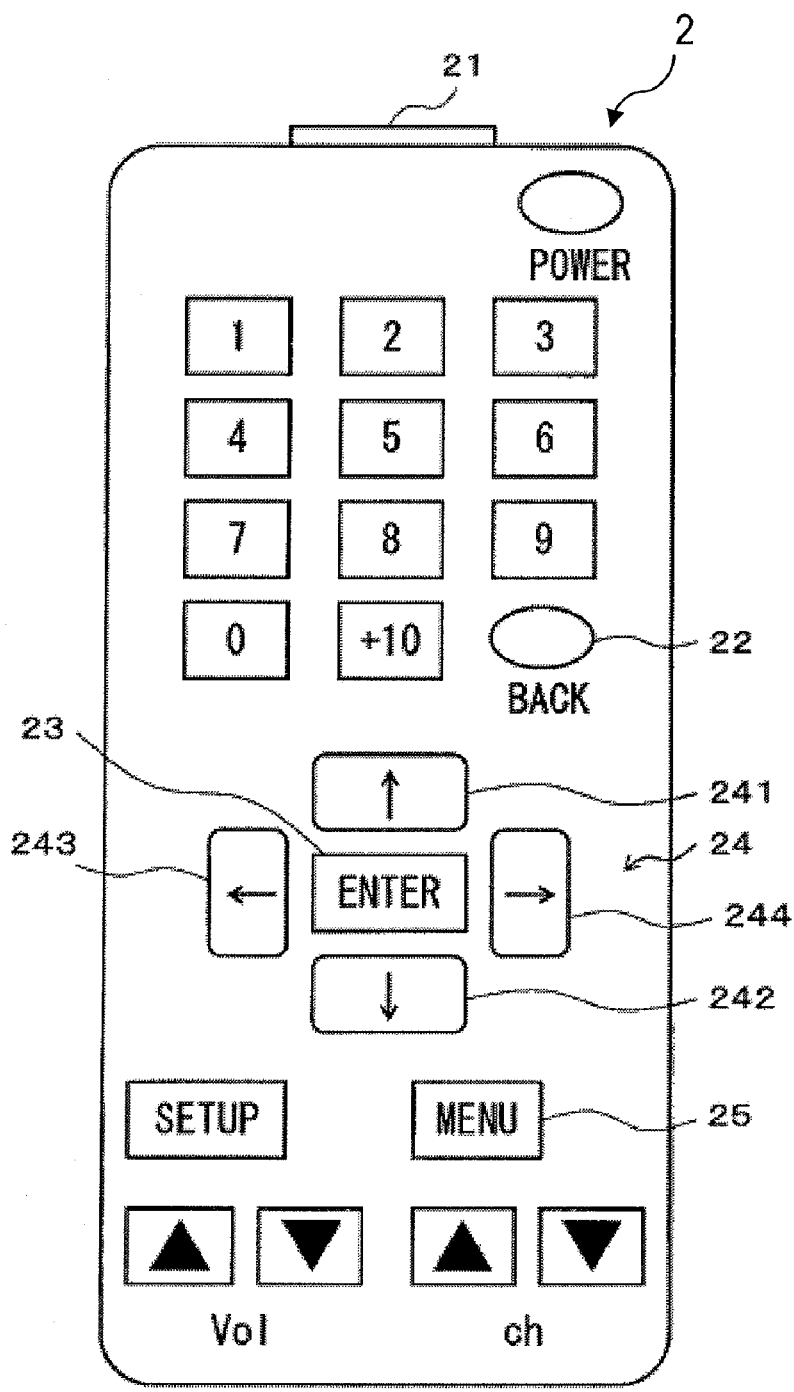
FIG. 2 is a plan view of a remote control of the broadcast receiver illustrated in FIG. 1.

FIG. 1 is a block diagram illustrating a digital broadcast receiver 1. The digital broadcast receiver 1 (e.g., broadcast receiving device) is communicably connected to a remote controller 2 (hereinafter referred to as "remote") shown in FIG. 2 via infrared communication.

The digital broadcast receiver 1 receives an operation input from a user via the remote 2. The digital broadcast receiver 1 receives television broadcasts and outputs one of the television broadcasts to a display 183. The digital broadcast receiver 1 includes an MPU (Micro Processing Unit) 11, a RAM (Random Access Memory) 12, a ROM (Read Only Memory) 13, a control panel 14, a reception component 15, an audio output component 16, an MPEG-2 (Motion Picture Experts Group) decoder 17, an image output component 18 and an infrared communicator 19.

The MPU 11 controls an operation of the entire digital broadcast receiver 1. The RAM 12 readably and writably stores information such as audio information and video information. The ROM 13 stores a control program for operating the MPU 11, for example.

The control panel 14 is used to perform various operations, such as turning the power on and off, and changing the channel. The reception component 15 receives and demodulates television broadcasts. The reception component 15 includes an antenna 151, a tuner 152, an A/D converter 153, a demodulator 154, and a TS demultiplexer 155.

The antenna 151 receives television broadcast waves. The tuner 152 tunes in a preset channel from the television broadcast waves received by the antenna 151. The A/D converter 153 converts an analog output signal of the tuner 152 into a digital signal. The demodulator 154 demodulates output information from the A/D converter 153. The TS demultiplexer 155 separates the output information demodulated by the demodulator 154 by type, and outputs audio information and video information.

The audio output component 16 outputs the audio corresponding to the television broadcast received by the reception component 15. The audio output component 16 includes a D/A converter 161, an audio signal output component 162 and a speaker 163. The D/A converter 161 converts the audio information outputted from the TS demultiplexer 155 (digital information) into an analog audio signal. The audio signal output component 162 outputs the analog audio signal to the speaker 163. The speaker 163 outputs audio corresponding to the analog audio signal.

The MPEG 2 decoder 17 decodes the video information outputted from the TS demultiplexer 155 into pre-compression video information.

The image output component 18 outputs the video information decoded by the MPEG2 decoder 17. The image output component 18 includes an NTSC (National Television Standards Committee) encoder 181, an image signal output component 182 and a display 183. The NTSC encoder 181 converts the video information decoded by the MPEG2 decoder 17 into an NTSC-format television signal. The image signal output component 182 outputs the NTSC-format television signal to the display 183. The display 183 is a display device such as an LCD (Liquid Crystal Display), PDP (Plasma Display Panel), or the like. The display 183 displays video corresponding to the NTSC-format television signal outputted from the image signal output component 182.

The infrared communicator 19 is used to perform various operations from the remote 2, such as turning the power on and off, changing the channel, and changing settings of the digital broadcast receiver 1 (such as viewing control settings).

The digital broadcast receiver 1 receives the television broadcasts as follows. First, a transmitted digital broadcast wave is received by the antenna 151. When the control panel 14 is used to tune in a channel, switching of a transponder or a channel received by the tuner 152 is performed. The received digital broadcast wave is converted into digital information by the A/D converter 153, and demodulated by the demodulator 154.

The digital broadcast wave is transmitted from a transmitting side (transmitting station) as a TS (Transport Stream) packet. The TS packet includes the video information, the audio information, control information including channel information and viewing control table information, and so forth. The viewing control table information further includes a viewing control table having viewing control conditions. The video information, the audio information and the control information are separated and outputted by the TS demultiplexer 155. Then, the video information, the audio information and the control information are stored in the RAM 12. The audio information is read out from the RAM 12, and is converted into an analog audio signal by the D/A converter 161. Then, audio is outputted from the speaker 163 via the audio signal output component 162.

Also, the video information is read out from the RAM 12, and is decoded into pre-compression video information by the MPEG2 decoder 17. Then, the pre-compression video information is converted into an NTSC-format television signal by the NTSC encoder 181. Then, a video image is displayed on the display 183 via the image signal output component 182.

The remote 2 receives operation input from a user. The remote 2 produces an infrared signal corresponding to the operation input. Then, the remote 2 outputs the infrared signal to the digital broadcast receiver 1. The remote 2 includes an infrared signal output component 21, a back key 22, an enter key 23, direction keys 24 and a menu key 25. The infrared signal output component 21 produces an operation signal corresponding to a key pressed by the user. The infrared signal output component 21 converts the signal into the infrared signal. Then, the infrared signal output component 21 transmits the signal to the digital broadcast receiver 1.

The back key 22 is pressed to return a currently displayed screen to an original screen. The enter key 23 is pressed to set various settings, such as the viewing control conditions of the digital broadcast receiver 1. The direction keys 24 are pressed to select one of a plurality of categories that can be selected and are displayed on the display 183. The direction keys 24 include an up key 241, a down key 242, a left key 243 and a right key 244. The up key 241 is a key for moving a selected state upward. The down key 242 is a key for moving the selected state downward. The left key 243 is a key for moving the selected state to the left. The right key 244 is a key for moving the selected state to the right. The menu key 25 is pressed to display a menu screen when setting various settings, such as the viewing control conditions of the digital broadcast receiver 1.

Figure 3:
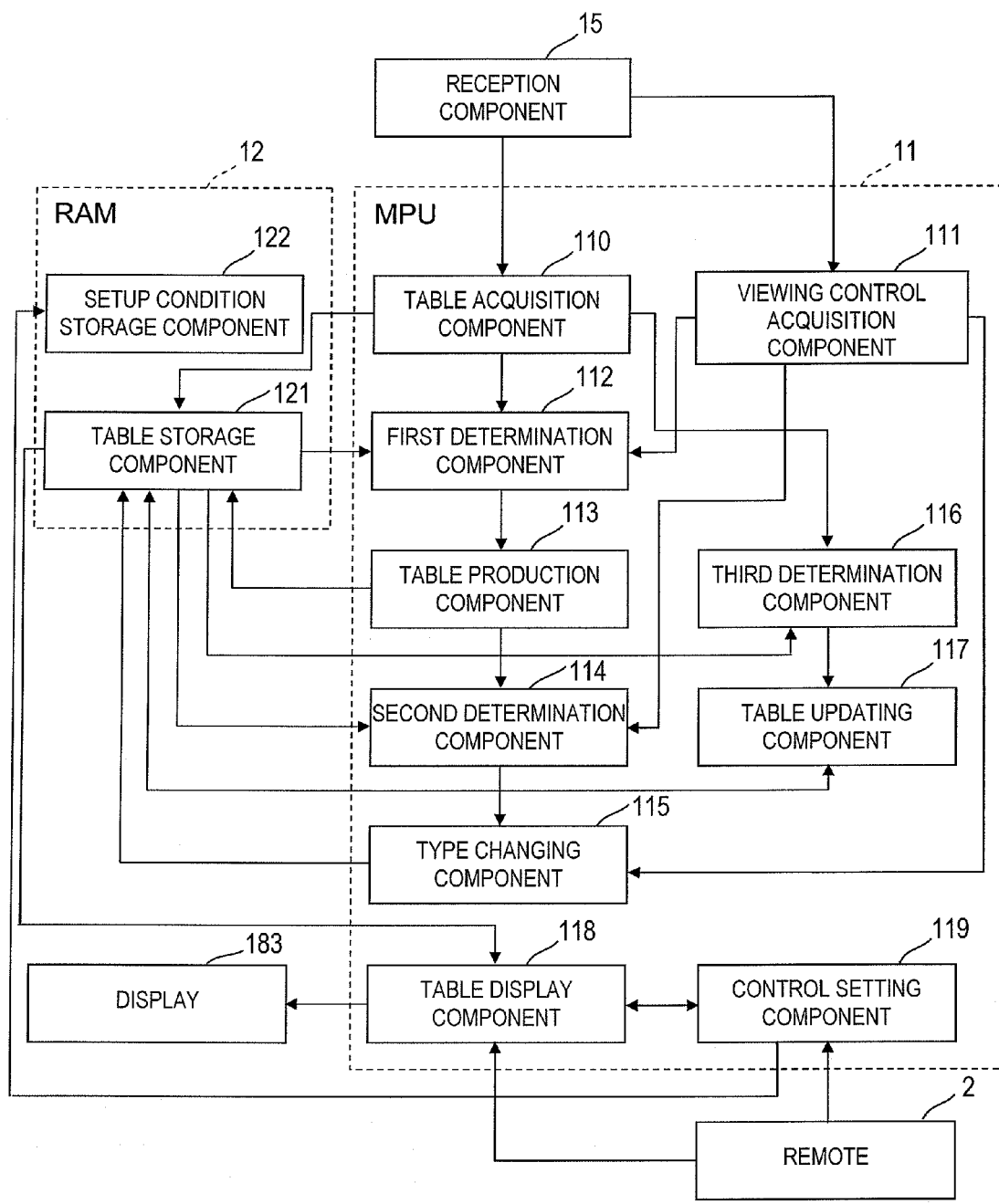
FIG. 3 is a block diagram illustrating a functional configuration of the broadcast receiver illustrated in FIG. 1.

FIG. 3 is a block diagram illustrating a functional configuration of the broadcast receiver 1. The MPU 11 functionally includes a table acquisition component 110, a viewing control acquisition component 111, a first determination component 112, a table production component 113, a second determination component 114, a type changing component 115, a third determination component 116, a table updating component 117, a table display component 118, and a control setting component 119. The RAM 12 functionally includes as a table storage component 121 and a setup condition storage component 122.

The MPU 11 reads and executes a control program that has been pre-stored in the ROM 13, etc., shown in FIG. 1. Then, the MPU 11 functions as the table acquisition component 110, the viewing control acquisition component 111, the first determination component 112, the table production component 113, the second determination component 114, the type changing component 115, the third determination component 116, the table updating component 117, the table display component 118 and the control setting component 119. Also, the MPU 11 causes the RAM 12 to function as the table storage component 121, the setup condition storage component 122, or another such functional component.

Data stored in the RAM 12 and ROM 13 can be stored on a removable recording medium such as a hard disk, optical disk, flexible disk, CD (Compact Disk), DVD (Digital Versatile Disk), semiconductor memory, or the like. In this case, the data can be readable by a hard disk drive, optical disk drive, flexible disk drive, silicon disk drive, cassette medium reader, or other such driver.

The table storage component 121 stores a viewing control table as a stored viewing control table TB1 (e.g., first viewing control table). The table storage component 121 acquires a viewing control table newly acquired by the table acquisition component 110 as an acquired viewing control table (e.g., third viewing control table). The stored viewing control table TB1 is replaced with the acquired viewing control table. Then, the table storage component 121 stores the acquired viewing control table as an updated viewing control table (e.g., third viewing control table). The table storage component 121 also stores a tentative viewing control table TB2 (e.g., second viewing control table) produced by the table production component 113. The stored viewing control table TB1 is configured to be updated with the acquired viewing control table by the table updating component 117. Then, the tentative viewing control table TB2 is deleted by the table updating component 117.

The stored viewing control table TB1 has a first specific number of two or more columns ("3", for example) and a second specific number of two or more rows ("7", for example). In other words, the first specific number is the number of columns of the stored viewing control table TB1. The second specific number is the number of rows of the stored viewing control table TB1. The stored viewing control table TB1 includes the viewing control conditions that are preset according to positions in a column direction and positions in a row direction as shown in FIG. 4A. Each column of the stored viewing control table TB1 and the tentative viewing control table TB2 is set to either an order type or a category type. A column set to the order type includes the viewing control conditions ranked in the order of rating levels from the lowest rating to the highest rating as the row number increases. In other words, the column set to the order type includes the viewing control conditions so that the viewing control becomes stronger as the row number increases. A column set to the category type includes the viewing control conditions that vary with the row number. In other words, the column set to the category type includes the viewing control conditions so that type of the viewing control varies with the row number.

FIG. 4A is a diagram illustrating the stored viewing control table TB1 that is a viewing control table stored in the table storage component 121 prior to update. The stored viewing control table TB1 including viewing control conditions. FIG. 4B is a diagram illustrating the tentative viewing control table TB2. As shown in FIG. 4A, the first column of the stored viewing control table TB1 includes viewing control conditions having a rating category name "TV-AA". The first column of the stored viewing control table TB1 is set to the order type. The viewing control conditions "TV-AA" includes ratings according to MPAA (Motion Picture Association of America) standards. Specifically, beginning with the first row in the first column, the viewing control conditions "TV-AA" include following viewing control conditions: X, NC-17, R, PG-13, PG, G, and NR.

The X in the first row is a rating that is an old version of the NC-17. The NC-17 (No Children under 17, or No One 17 and Under Admitted) in the second row means that no one under 18 years old (17 years or under) is admitted to enjoy the viewing. The R (Restricted) in the third row means that an accompanying a parent or a guardian is required. The PG-13 (Parents strongly cautioned) in the fourth row means that a parent or a guardian must exercise caution over viewing by a child under 13 years old (12 years or under).

The PG (Parental Guidance suggested) in the fifth row means that it is recommended that a parent or a guardian check the content before it is viewed by a child. The G (General audiences) in the sixth row means the work is suitable for all ages. The NR (Not Rated) in the seventh row means that there is no viewing control. A program that is intended for younger viewers and has a high rating level can be blocked with a stricter viewing control. A program that is intended for older viewers and has a low rating level can be blocked with a looser viewing control.

The stored viewing control table TB1 further includes viewing control conditions having a rating category name "TV-BB" in the second column and viewing control conditions having a rating category name "TV-CC" in the third column. The second and third columns of the stored viewing control table TB1 are set to the category type, respectively.

The setup condition storage component 122 stores setup condition information corresponding to the stored viewing control table TB1 and the tentative viewing control table TB2. Specifically, the setup condition information indicates whether or not each of the viewing controls corresponding to each of the viewing control conditions stored in the stored viewing control table TB1 and the tentative viewing control table TB2 is to be executed. In other words, the setup condition information indicates whether or not the viewing of programs is to be blocked with each of the viewing control conditions stored in the stored viewing control table TB1 and the tentative viewing control table TB2. The setup conditions stored in the setup condition storage component 122 are set by the control setting component 119. For example, the stored viewing control table TB1 shown in FIG. 4A includes 21 total viewing control conditions (seven rows and three columns). Thus, the setup condition storage component 122 stores the setup condition information corresponding to each of the 21 viewing control conditions.

The table acquisition component 110 acquires an RRT (Rating Region Table; e.g., viewing control table information) received via the reception component 15. The table acquisition component 111 produces the acquired viewing control table based on the acquired RRT.

The viewing control acquisition component 111 acquires a CAD (Content Advisory Descriptor; e.g., program viewing control information). The CAD is included in an event information table (hereinafter referred to as "EIT") received via the reception component 15. The CAD includes a column number and a row number. Then, the CAD specifies viewing control conditions with the column number and the row number.

The first determination component 112 determines whether or not one of a column determination condition and a row determination condition is satisfied. The column determination condition is a condition that the column number of the CAD is greater than the first specific number ("3", for example). The row determination condition is a condition that the row number of the CAD is greater than the second specific number ("7", for example). If one of the column determination condition and the row determination condition is satisfied, then the location indicated by the CAD is a location not included in the stored viewing control table TB1. In other word, if one of the column determination condition and the row determination condition is satisfied, then the CAD is determined to be program viewing control information corresponding to the updated (new) viewing control table other than the stored viewing control table TB1. Furthermore, the stored viewing control table TB1 is determined to be a pre-update (old) viewing control table.

The table production component 113 produces the tentative viewing control table TB2 when the first determination component 112 determines that one of the column determination condition and the row determination condition is satisfied. The tentative viewing control table TB2 has a number of columns corresponding to the column number of the CAD and a number of rows corresponding to the row number of the CAD. Then, the table production component 113 sets the column having a column number corresponding to the column number of the CAD to the order type in the tentative viewing control table TB2. Furthermore, the table production component 113 stores the tentative viewing control table TB2 in the table storage component 121.

FIG. 4B is a diagram illustrating an example of the tentative viewing control table TB2. A situation will be described here, for example, in which the column number of the CAD is "4", and the row number is "5". Since the column number of the CAD is "4" and the first specific number is "3", the column determination condition is satisfied. Since the row number of the CAD is "5" and the second specific number is "7", the row determination condition is not satisfied.

Since the column determination condition is satisfied in this case, the table production component 113 produces the tentative viewing control table TB2 having five rows and four columns. The tentative viewing control table TB2 has a number of rows corresponding to the row number "5" of the CAD and a number of columns corresponding to the column number "4" of the CAD as shown in FIG. 4B. Also, the forth column corresponding to the column number of the CAD is set to order type in the tentative viewing control table TB2.

The second determination component 114 determines whether or not a plurality of CADs is included in a program corresponding to a CAD which is determined to satisfy one of the column determination condition and the row determination condition. If it is determined that a plurality of CADs is included, then it is further determined whether or not to satisfy a determination condition that the plurality of CADs has the same column number and adjacent row numbers.

For instance, when a CAD having a column number of "4" and a row number of "5" has been acquired for an EIT of a program, and the EIT includes another CAD having a column number of "4" and a row number of "4", then, the determination condition that the CADs have the same column number and have adjacent row numbers is satisfied. Also, for example, when a CAD having a column number of "4" and a row number of "5" has been acquired for an EIT of a program, and the EIT includes another CAD having a column number of "4" and a row number of "2", then, the determination condition is not satisfied since the CADs do not have adjacent row numbers. Further, for example, when a CAD having a column number of "4" and a row number of "5" has been acquired for an EIT of a program, and the EIT includes another CAD having a column number of "3" and a row number of "4", then, the determination condition is not satisfied since the CADs do not have the same column number.

When the second determination component 114 determines that the determination condition is not satisfied, the type changing component 115 changes the type of the column (the fourth column) corresponding to the column number ("4" in this case) of the CAD from the order type to the category type in the tentative viewing control table TB2.

For instance, when a CAD having a column number of "4" and a row number of "5" has been acquired for an EIT of a program, and the EIT includes another CAD having a column number of "4" and a row number of "2", then, the type changing component 115 changes the type of the fourth column of the tentative viewing control table TB2 from the order type to the category type. Furthermore, when a CAD having a column number of "4" and a row number of "5" has been acquired for an EIT of a program, and the EIT includes another CAD having a column number of "3" and a row number of "4", then, the type changing component 115 changes the type of the fourth column of the tentative viewing control table TB2 from the order type to the category type.

The third determination component 116 determines whether or not the acquired viewing control table acquired by the table acquisition component 110 matches the stored viewing control table TB1 stored in the table storage component 121. Specifically, the third determination component 116 determines whether or not the acquired viewing control table is an updated (new) viewing control table.

When the third determination component 116 determines that there is no match, the table updating component 117 stores the acquired viewing control table in the table storage component 121 as the updated viewing control table to replace the stored viewing control table TB1. Then, the table updating component 117 deletes the tentative viewing control table TB2 stored in the table storage component 121.

The table display component 118 receives operation input from the user and displays the stored viewing control table TB1 or the tentative viewing control table TB2 stored in the table storage component 121 on the display 183 based on the received operation input.

The control setting component 119 receives the operation input from the user via the remote 2. Then, the control setting component 119 sets whether or not to execute viewing control corresponding to a CAD acquired by the viewing control acquisition component 111 via the stored viewing control table TB1 or the tentative viewing control table TB2 displayed on the display 183 as shown in FIGS. 5 and 6.

FIGS. 5 and 6 are each a screen shot of a rating setting screen displayed on the display 183. FIG. 5 is a screen shot of the rating setting screen when the stored viewing control table TB1 shown in FIG. 4A is stored in the table storage component 121. FIG. 6 is a screen shot of the rating setting screen when the stored viewing control table TB1 shown in FIG. 4A and the tentative viewing control table TB2 shown in FIG. 4B are stored in the table storage component 121.

Figure 5A:
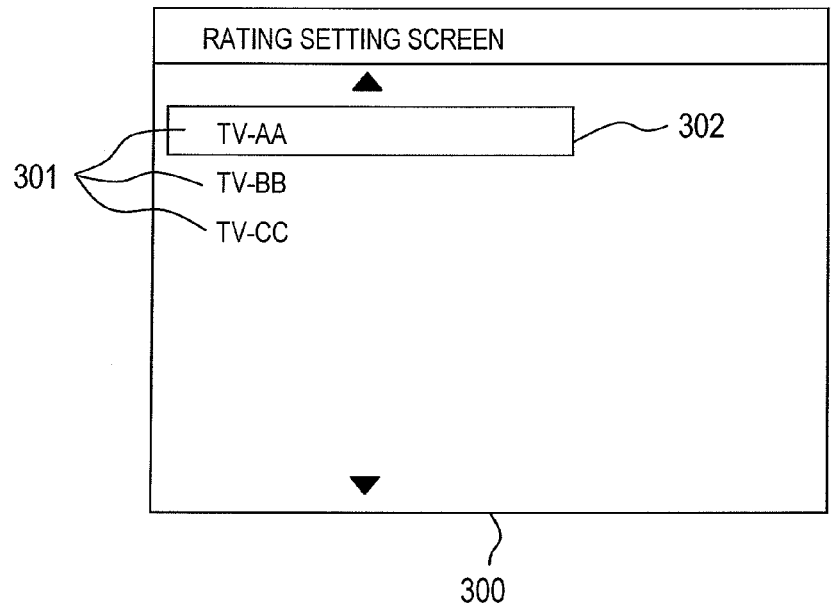
FIG. 5A is a screen shot of a rating category selection screen corresponding to the stored viewing control table.
Figure 6A:
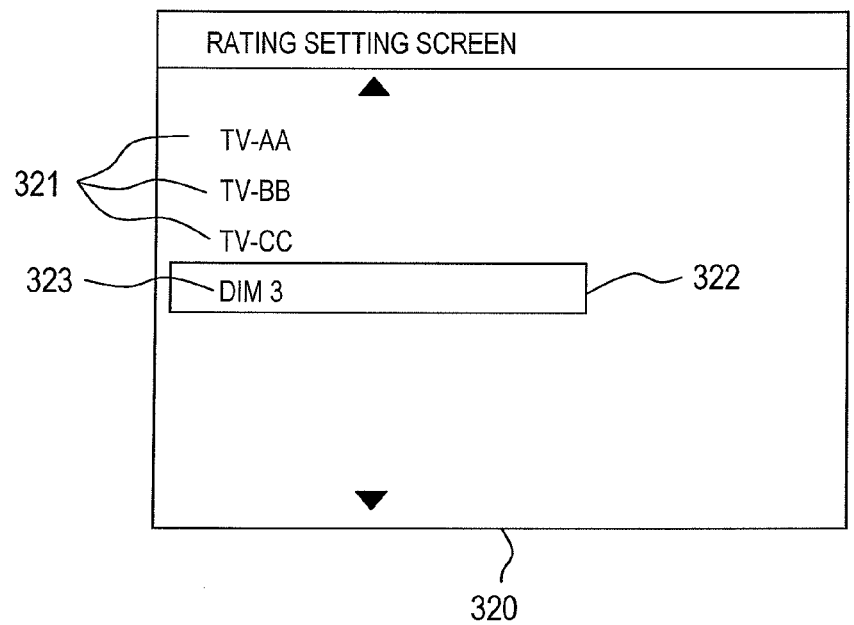
FIG. 6A is a screen shot of a rating category selection screen corresponding to the stored viewing control table and the tentative viewing control table.

The table display component 118 displays rating category selection screens 300 and 320 shown in FIGS. 5A and 6A when the operation signal corresponding to the menu key 25 on the remote 2 has been received. As shown in FIG. 5A, the rating category selection screen 300 displays a category name display component 301 and a selection mark 302. The category name display component 301 displays the rating category names of the viewing control conditions of the stored viewing control table TB1 shown in FIG. 4A. The selection mark 302 indicates a selected state.

As shown in FIG. 6A, the rating category selection screen 320 displays category name display components 321 and 323 and a selection mark 322. The category name display component 321 displays the rating category names of the viewing control conditions of the stored viewing control table TB1 shown in FIG. 4A. The category name display component 323 displays the rating category names of the viewing control conditions of the tentative viewing control table TB2 shown in FIG. 4B. The selection mark 322 indicates a selected state.

When an operation signal corresponding to the up key 241 on the remote 2 is received, the table display component 118 moves the selection marks 302 and 322 upward and changes the category name display components 301, 321 and 323 in the selected state. Also, when an operation signal corresponding to the down key 242 on the remote 2 is received, the table display component 118 moves the selection marks 302 and 322 downward and changes the category name display components 301, 321, and 323 in the selected state.

Figure 5B:
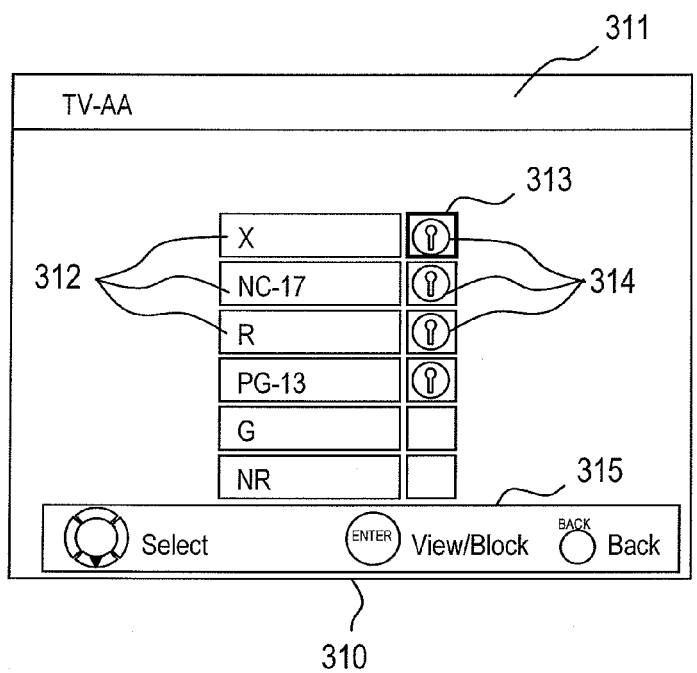
FIG. 5B is a screen shot of a viewing control setting screen corresponding to the stored viewing control table.
Figure 6B:
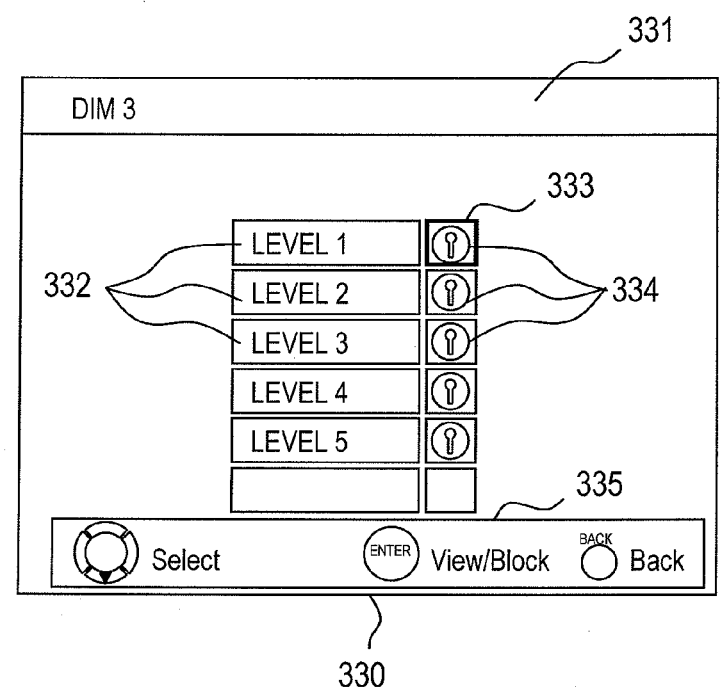
FIG. 6B is a screen shot of a viewing control setting screen corresponding to the stored viewing control table and the tentative viewing control table.

When an operation signal corresponding to the enter key 23 on the remote 2 is received, the table display component 118 displays viewing control setting screens 310 and 330 shown in FIGS. 5B and 6B. The viewing control setting screens 310 and 330 includes category name display components 311 and 331, viewing control condition display components 312 and 332, selection marks 313 and 333, block marks 314 and 334 and guidance display components 315 and 335. The category name display components 311 and 331 display the rating category names selected through the rating category selection screens 300 and 320. The viewing control condition display components 312 and 332 display the viewing control conditions stored in a column of the stored viewing control table TB1 or the tentative viewing control table TB2 corresponding to the selected viewing control conditions (rating categories). The selection marks 313 and 333 indicate the selected state. The block marks 314 and 334 indicate whether or not the viewing control corresponding to each of the viewing control conditions will be executed. In other words, the block marks 314 and 334 indicate whether or not the viewing of programs corresponding to each of the viewing control conditions will be blocked. The block marks 314 and 334 are displayed to the right of the viewing control condition display components 312 and 332. The guidance display components 315 and 335 display operation guidance information.

The guidance display components 315 and 335 display first operation guidance information, second operation guidance information and third operation guidance information from left to right. The first operation guidance information indicates using the up key 241 and the down key 242 to change the selected state of the viewing control condition display components 312 and 332. The second operation guidance information indicates using the enter key 23 to set whether or not the viewing control is to be executed (that is, whether or not to block the viewing of programs corresponding to viewing control conditions). The third operation guidance information indicates using the back key 22 to return to an immediately prior screen.

When an operation signal corresponding to the up key 241 on the remote 2 is received, the table display component 118 moves the selection marks 313 and 333 upward and changes the selected state of the viewing control condition display components 312 and 332. When an operation signal corresponding to the down key 242 on the remote 2 is received, the table display component 118 moves the selection marks 313 and 333 downward and changes the selected state of the viewing control condition display components 312 and 332.

When an operation signal corresponding to the enter key 23 is received on the viewing control setting screens 310 and 330 shown in FIGS. 5B and 6B, the control setting component 119 performs setting to execute the viewing control corresponding to the viewing control condition display components 312 and 332. Then, the control setting component 119 displays the block marks 314 and 334 indicating that the viewing control is to be executed.

When the type of column of the viewing control conditions being displayed on the viewing control setting screens 310 and 330 is order type, the control setting component 119 performs setting to execute the viewing control corresponding to the viewing control condition display components 312 and 332 in the selected state and all of the viewing control condition display components 312 and 332 displayed above the selected viewing control condition display components 312 and 332. This is because all of the viewing control condition display components 312 and 332 displayed above the selected viewing control condition display components 312 and 332 have lower rating level than the viewing control condition display components 312 and 332 in the selected state. Then, the control setting component 119 displays the block marks 314 and 334 indicating that the viewing control is to be executed.

Also, when an operation signal corresponding to the back key 22 on the remote 2 is received while the viewing control setting screens 310 and 330 shown in FIGS. 5B and 6B are displayed, the table display component 118 displays the rating category selection screens 300 and 320 shown in FIGS. 5A and 6A, respectively.

Figure 7:
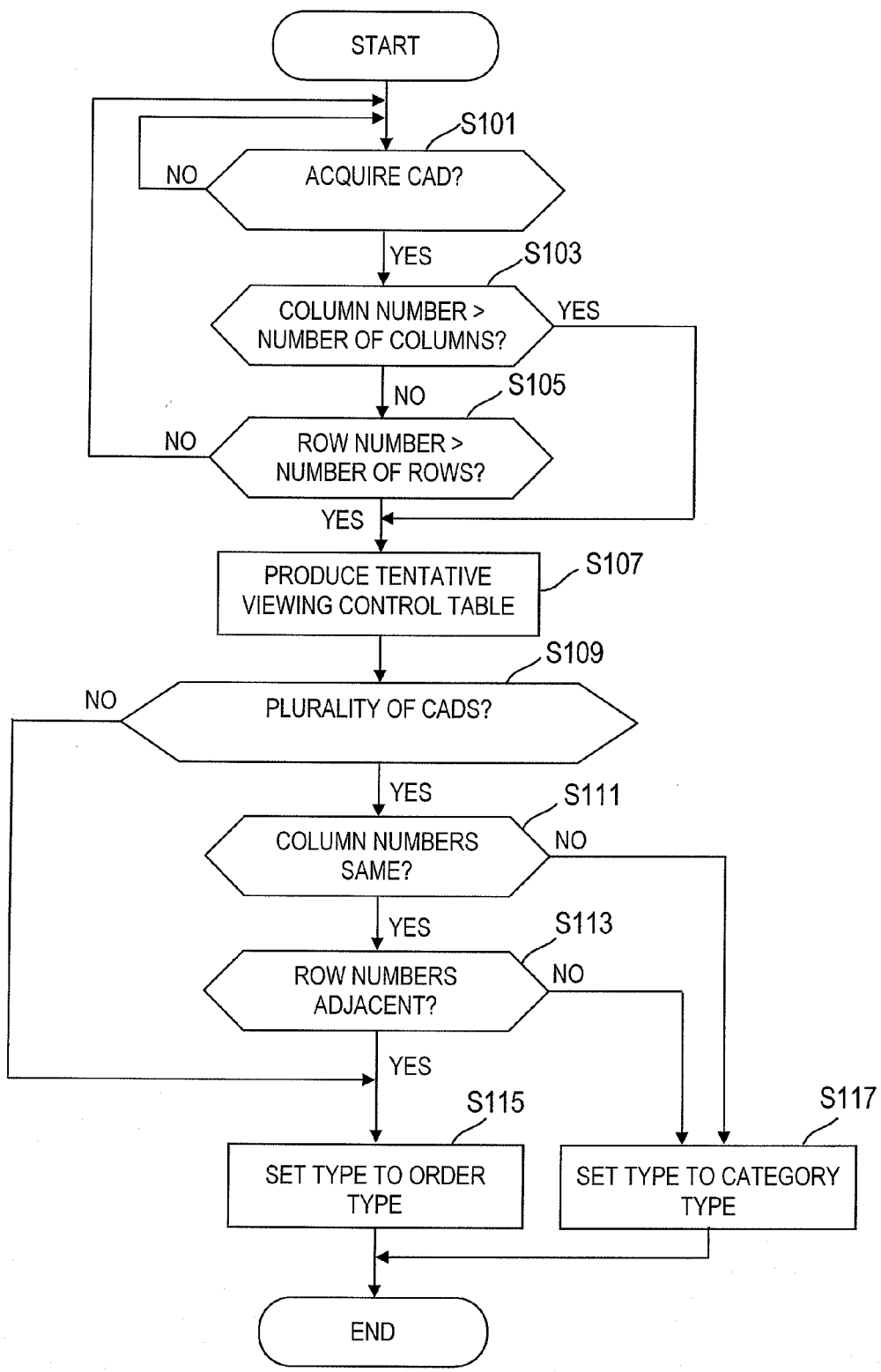
FIG. 7 is a flowchart illustrating an operation of the digital broadcast receiver illustrated in FIG. 1.

FIG. 7 is a flowchart illustrating an operation of the digital broadcast receiver 1. The RRT is received by the table acquisition component 110 via the reception component 15. The stored viewing control table TB1 is produced based on the acquired RRT. Then, the stored viewing control table TB1 is stored in the table storage component 121.

First, the viewing control acquisition component 111 determines whether or not the CAD has been acquired (S101). If it is determined that the CAD has not been acquired (No in S101), then the processing enters a standby state. If it is determined that the CAD has been acquired (Yes in S101), then the first determination component 112 determines whether or not the column determination condition is satisfied (S103). The column determination condition is a condition that the column number of the CAD acquired in step S101 is greater than the first specific number. The first specific number is the number of columns in the stored viewing control table TB1 ("3", for example). If the column number is determined to be greater than the first specific number (Yes in S103), then the processing moves on to step S107. If it is determined that the column number is less than or equal to the first specific number (No in S103), then the first determination component 112 determines whether or not the row determination condition is satisfied (S105). The row determination condition is a condition that the row number of the CAD acquired in step S101 is greater than the second specific number. The second specific number is the number of rows in the stored viewing control table TB1 ("7", for example).

If it is determined that the row number is less than or equal to the second specific number (No in S105), then the processing returns to step S101, and the processing from step S101 repeated. If it is determined that the row number is greater than the second specific number (Yes in S105), then the processing moves on to step S107. The table production component 113 produces the tentative viewing control table TB2 (S107). Then, the second determination component 114 determines whether or not a plurality of CADs is included in a program corresponding to the CAD (S109). If it is determined that a plurality of CADs is not included (that is, only one CAD is included) (No in S109), then the processing moves on to step S115.

If it is determined that a plurality of CADs is included (Yes in S109), then the second determination component 114 determines whether or not the plurality of CADs has the same column number (S111). If it is determined that the plurality of CADs does not have the same column number (that is, that they have different column numbers) (No in S111), then the processing moves on to step S117. If it is determined that the plurality of CADs has the same column number (Yes in S111), then the second determination component 114 determines whether or not the plurality of CADs has adjacent row numbers (S113).

If it is determined that the plurality of CADs does not have adjacent row numbers (that is, the row numbers are separated) (No in S113), then the processing moves on to step S117. The type changing component 115 sets the type of column corresponding to the column number of the CAD to the category type in the tentative viewing control table TB2 (S117), and the processing is concluded. If it is determined that the plurality of CADs has adjacent row numbers (Yes in S113), then the processing moves on to step S115. Then, the type changing component 115 sets the type of column corresponding to the column number of the CAD to the order type in the tentative viewing control table TB2 (S115), and the processing is concluded.

With the broadcast receiver 1, the viewing control table information (RRT) is acquired. The RRT includes the stored viewing control table TB1 having the first specific number of two or more ("3", for example) columns and the second specific number of two or more ("7", for example) rows. The viewing control conditions are specified in the stored viewing control table TB1. The viewing control conditions are preset according to the position in the column direction and the position in the row direction. The stored viewing control table TB1 is stored in the table storage component 121. Then, the CAD is acquired. The CAD specifies the viewing control conditions for each program with the column number and the row number. Then, it is determined whether or not one of the column determination condition and the row determination condition is satisfied. The column determination condition is a condition that the column number of the CAD is greater than the first specific number. The row determination condition is a condition that the row number of the CAD is greater than the second specific number. If it is determined that one of the column determination condition and the row determination condition is satisfied, then the tentative viewing control table TB2 having a number of columns corresponding to the column number of the CAD ("4", for example) and a number of rows corresponding to the row number of the CAD ("5", for example) is produced. Then, the tentative viewing control table TB2 is stored in the table storage component 121. Therefore, it is possible to set whether or not to execute the viewing control for the CAD corresponding to the updated viewing control table.

Specifically, if it is determined that one of the column determination condition and the row determination condition is satisfied, then the CAD indicates viewing control conditions other than the viewing control conditions specified in the stored viewing control table TB1. That is, in this case, the CAD corresponds to an updated (new) viewing control table. Thus, the stored viewing control table TB1 is the pre-update (old) viewing control table.

Therefore, if it is determined that one of the row determination condition and the column determination condition is satisfied, then the tentative viewing control table TB2 is produced and stored in the table storage means 121. Therefore, whether or not to execute the viewing control can be set based on the CAD corresponding to the updated viewing control table via the tentative viewing control table TB2.

In other words, even though the updated viewing control table has yet to be received, by using the tentative viewing control table TB2 instead of the updated viewing control table, it is possible to set whether or not to execute the viewing control based on the CAD corresponding to the updated viewing control table.

Also, each column of the stored viewing control table TB1 and the tentative viewing control table TB2 is set to either the order type or the category type. Furthermore, the type of column corresponding to the column number ("4", for example) of the newly acquired CAD is set to the order type in the tentative viewing control table TB2. Therefore, a setting to execute the viewing control can be reliably performed based on the CAD corresponding to the updated viewing control table.

Specifically, the type of column corresponding to the column number of the newly acquired CAD is set to the order type. When the user performs setting based on the CAD corresponding to the updated viewing control table to execute the viewing control, the setting can be performed within a range less than or equal to the row number indicated by the row number included in the CAD. Therefore, a setting that the viewing control is to be executed can be reliably performed.

When the type of column is set to the category type, a setting by the user that the viewing control is to be executed is reflected only on a viewing control condition. Specifically, the setting is reflected on a viewing control condition in a row having the row number indicated by the row number of the CAD. Thus, even if the type of column corresponding to the column number of newly acquired CAD is the order type, the setting is not made over the range that is supposed to be set for execution of the viewing control (that is, the range of row numbers smaller than the row number indicated by the row number of the CAD). Therefore, if the type of column is set to the category type, then there is a risk that the viewing of programs that were originally supposed to be subjected to the viewing control will not be blocked. Thus, with the broadcast receiver 1, the viewing control is properly executed.

Furthermore, if a plurality of CADs is included in a program corresponding to the CAD determined to satisfy one of the column determination condition and the row determination condition, then it is determined whether or not the determination condition that the plurality of CADs has the same column number and adjacent row numbers is satisfied. If it is determined that the determination condition is not satisfied, then the type of the column corresponding to the column number of the acquired CAD is changed from the order type to the category type in the tentative viewing control table TB2. Therefore, whether or not to execute the viewing control can be set more accurately.

Specifically, if it is determined that the determination condition is not satisfied, then a single program includes either a plurality of CADs having different column numbers, or a plurality of CADs having separated row numbers. Therefore, it is assumed that the type of column corresponding to the acquired CAD is the category type. Thus, whether or not to execute the viewing control can be set more accurately by changing the type of column corresponding to the column number of the acquired CAD from the order type to the category type.

In addition, it is determined whether or not the acquired viewing control table matches the stored viewing control table TB1. Furthermore, when it is determined that there is no match, then, the acquired viewing control table is stored in the table storage component 121 to replace the stored viewing control table TB1. Moreover, the tentative viewing control table TB2 is deleted. Therefore, whether or not to execute the viewing control can be set even more accurately based on the CAD corresponding to the updated viewing control table.

Specifically, when a new viewing control table is acquired, the new viewing control table is stored as the updated viewing control table in the table storage component 121. Thus, whether or not the viewing control is to be executed can be set with the updated viewing control table. Therefore, whether or not the viewing control is to be executed can be set even more accurately based on the CAD corresponding to the updated viewing control table.

Also, the operation input is received from the user through the remote 2. The tentative viewing control table TB2 is displayed on the display 183 based on the received operation input. Furthermore, a setting as to whether or not the viewing control corresponding to the acquired CAD is to be executed is performed based on the received operation input. Therefore, it is easy to set whether or not the viewing control is to be executed based on the CAD corresponding to the updated viewing control table via the tentative viewing control table TB2.

The broadcast receiver 1 can be any type of broadcast receiving device that receives television broadcasts and outputs the television broadcasts to the display 183 so that the television broadcasts are visible from outside. For instance, the broadcast receiving device can be a device that receives analog broadcasts or both analog and digital broadcasts. However, the broadcast receiver 1 has a function for acquiring the viewing control table information corresponding to the RRT.

The display 183 can be configured as a device that is separate from the digital broadcast receiver 1. For example, the display 183 can be a monitor provided to a personal computer or the like.

At least one of the table display component 118 and the control setting component 119 can receive the operation input from the user via the control panel 14 instead of the remote 2.

In this embodiment, a case was described in which the transmission period of the RRT is 60 seconds, and the transmission period of the CAD is 0.5 second. However, the transmission periods of the RRT and the CAD are not limited to those values. For example, when the transmission periods of the RRT and the CAD are the same (such as 0.5 second), if an updated CAD is received before an updated RRT is received, then it is necessary to set whether or not to execute the viewing control corresponding to the CAD via the tentative viewing control table TB2.

General Interpretation of Terms

In understanding the scope of the present invention, the term "configured" as used herein to describe a component, section or part of a device includes hardware and/or software that is constructed and/or programmed to carry out the desired function. In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts.

While only a preferred embodiment has been chosen to illustrate the present invention, it will be apparent to those skilled in the art from this disclosure that various changes and modifications can be made herein without departing from the scope of the invention as defined in the appended claims. Furthermore, the foregoing description of the preferred embodiment according to the present invention is provided for illustration only, and not for the purpose of limiting the invention as defined by the appended claims and their equivalents.

What is claimed is:

1. A broadcast receiving device for receiving a television broadcast, comprising:
    a table storage component configured to store a first viewing control table having a first specific number of columns and a second specific number of rows, the first viewing control table including viewing control conditions for viewing control;
    a viewing control acquisition component configured to acquire program viewing control information including a column number and a row number and specifying the viewing control conditions for a program using the column number and the row number;
    a first determination component configured to determine whether or not to satisfy one of a column determination condition that the column number of the program viewing control information is greater than the first specific number of the first viewing control table and a row determination condition that the row number of the program viewing control information is greater than the second specific number of the first viewing control table; and
    a table production component configured to produce a second viewing control table having a number of columns corresponding to the column number of the program viewing control information and a number of rows corresponding to the row number of the program viewing control information based on the program viewing control information in response to the first determination component determining that one of the column determination condition and the row determination condition is satisfied.

2. The broadcast receiving device according to claim 1, wherein
the table production component is further configured to store the second viewing control table in the table storage component.

3. The broadcast receiving device according to claim 1, further comprising
a table acquisition component configured to acquire the first viewing control table via the television broadcast.

4. The broadcast receiving device according to claim 1, wherein
the first viewing control table has two or more columns and two or more rows, and stores each of the viewing control conditions according to a column number of the first viewing control table and a row number of the first viewing control table.

5. The broadcast receiving device according to claim 1, wherein
a column of the second viewing control table is set to either an order type, which indicates that the column includes the viewing control conditions ranked in an order of rating levels from a lowest rating to a highest rating as a row number of the second viewing control table increases, or a category type, which indicates that the column includes the viewing control conditions varying with the row number, and
the table production component sets a type of the column of the second viewing control table having a column number corresponding to the column number of the program viewing control information to the order type.

6. The broadcast receiving device according to claim 1, further comprising
a table acquisition component configured to acquire a third viewing control table via the television broadcast;
a third determination component configured to determine whether or not the third viewing control table matches the first viewing control table stored in the table storage component; and
a table update component configured to replace the first viewing control table stored in the table storage component with the third viewing control table when the third determination component determines that the third viewing control table does not match the first viewing control table.

7. The broadcast receiving device according to claim 6, wherein
the table update component is further configured to delete the second viewing control table when the third determination component determines that the third viewing control table does not match the first viewing control table.

8. The broadcast receiving device according to claim 5, further comprising
a table acquisition component configured to acquire a third viewing control table via the television broadcast;
a third determination component configured to determine whether or not the third viewing control table matches the first viewing control table stored in the table storage component; and
a table update component configured to replace the first viewing control table stored in the table storage component with the third viewing control table when the third determination component determines that the third viewing control table does not match the first viewing control table.

9. The broadcast receiving device according to claim 1, further comprising a table display component configured to receive operation input and display the second viewing control table based on the operation input, and
a viewing control setting component configured to receive the operation input and set whether or not to execute the viewing control corresponding to the program viewing control information based on the operation input.

10. A viewing control method for a broadcast receiving device for receiving a television broadcast, comprising:
acquiring program viewing control information including a column number and a row number and specifying viewing control conditions for viewing control for a program using the column number and the row number;
determining whether or not to satisfy one of a column determination condition that the column number of the program viewing control information is greater than a first specific number of columns of a first viewing control table and a row determination condition that the row number of the program viewing control information is greater than a second specific number of rows of the first viewing control table, the first viewing control table including the viewing control conditions for the viewing control; and
producing a second viewing control table having a number of columns corresponding to the column number of the program viewing control information and a number of rows corresponding to the row number of the program viewing control information based on the program viewing control information in response to determining that one of the column determination condition and the row determination condition is satisfied.

11. A broadcast receiving device for receiving a television broadcast, comprising:
a table storage component configured to store a first viewing control table having a first specific number of columns and a second specific number of rows, the first viewing control table including viewing control conditions for viewing control;
a viewing control acquisition component configured to acquire program viewing control information including a column number and a row number and specifying the viewing control conditions for a program using the column number and the row number;
a first determination component configured to determine whether or not to satisfy one of a column determination condition that the column number of the program viewing control information is greater than the first specific number of the first viewing control table and a row determination condition that the row number of the program viewing control information is greater than the second specific number of the first viewing control table;
a table production component configured to produce a second viewing control table having a number of columns corresponding to the column number of the program viewing control information and a number of rows corresponding to the row number of the program viewing control information in response to the first determination component determining that one of the column determination condition and the row determination condition is satisfied, a column of the second viewing control table being set to either an order type, which indicates that the column includes the viewing control conditions ranked in an order of rating levels from a lowest rating to a highest rating as a row number of the second viewing control table increases, or a category type, which indicates that the column includes the viewing control conditions varying with the row number, the table production component setting a type of the column of the second viewing control table having a column number corresponding to the column number of the program viewing control information to the order type;

a second determination component configured to determine whether or not to satisfy a determination condition that a plurality of sets of program viewing control information for the program corresponding to the program viewing control information, which the first determination component determines to satisfy one of the column determination condition and the row determination condition, have a same column number and adjacent row numbers; and a type changing component configured to change the type of the column of the second viewing control table having the column number corresponding to the column number of the program viewing control information from the order type to the category type in response to the second determination component determining that the determination condition is not satisfied.

12. The broadcast receiving device according to claim 11, further comprising a table acquisition component configured to acquire a third viewing control table via the television broadcast;

a third determination component configured to determine whether or not the third viewing control table matches the first viewing control table stored in the table storage component; and a table update component configured to replace the first viewing control table stored in the table storage component with the third viewing control table when the third determination component determines that the third viewing control table does not match the first viewing control table.

* * * * *